March 17, 1953 G. D. McCARTHY ET AL 2,631,843
SPRING COVER
Filed Oct. 28, 1948
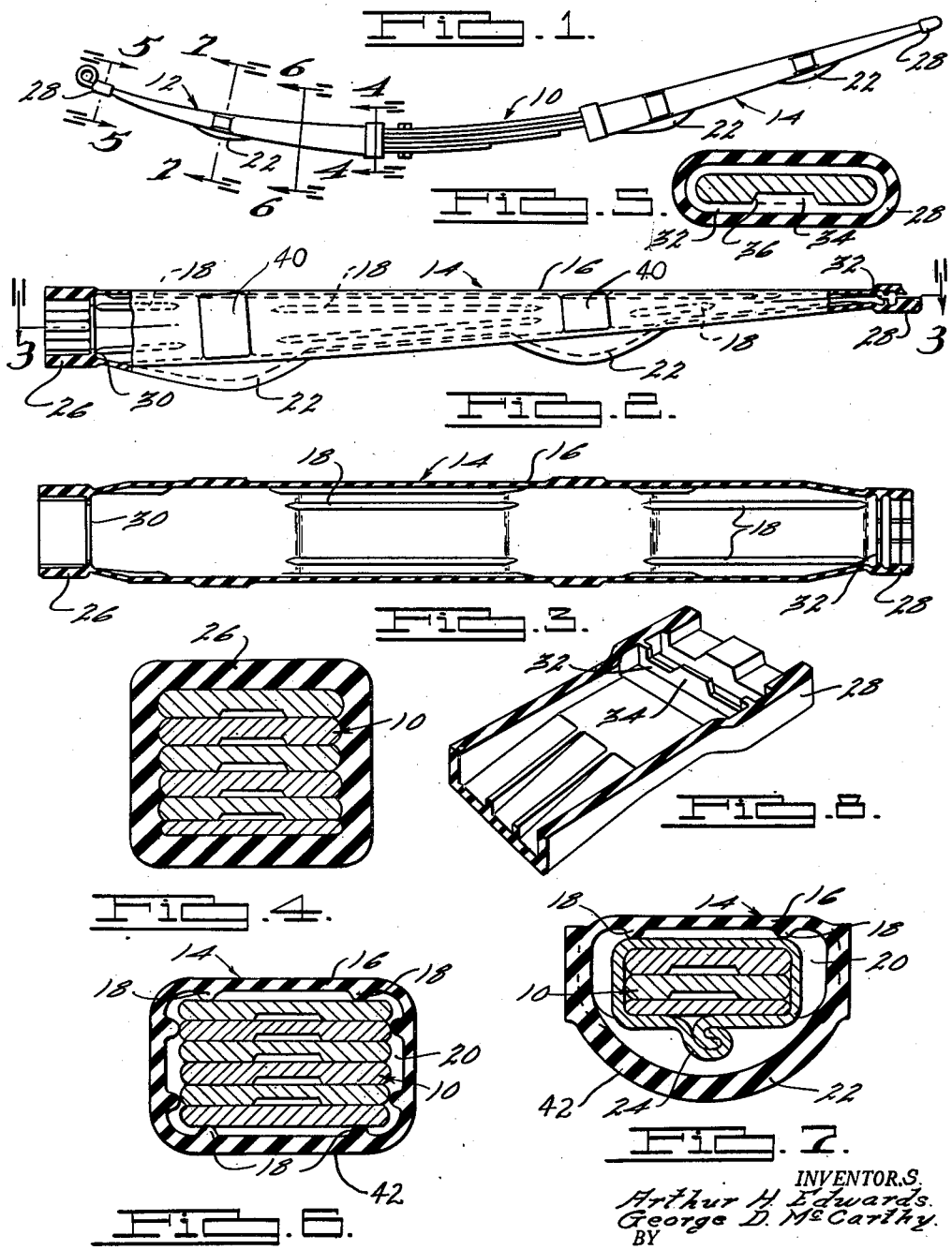
INVENTORS.
Arthur H. Edwards.
George D. McCarthy.
BY Harness and Harris
ATTORNEYS.

UNITED STATES PATENT OFFICE 2,631,843

SPRING COVER

George D. McCarthy, Detroit, and Arthur H. Edwards, Farmington, Mich., assignors to Chrysler Corporation, Highland Park, Mich., a corporation of Delaware Application October 28, 1948, Serial No. 57,036

1 Claim. (Cl. 267—37)

This invention relates to covers for springs and more particularly to covers for leaf springs, such as are employed in automobiles.

It is a principal object of the invention to provide a one-piece molded cover formed of an oil resistant synthetic rubber such as neoprene or Buna N–S blend. Each one-piece molded cover is capable of covering approximately ½ of the length of a leaf spring.

It is an additional object of the invention to provide a one-piece molded spring cover that does not require separate accessory parts, such as a liner, end seals or clips.

It is a further object of the invention to provide a relatively loose cover for holding lubricant in association with a spring and to provide integral tight bands at the ends of the cover to seal the lubricant therewithin and prevent the entrance of water and dirt.

It is also an object of the invention to form beads integrally with the cover which serve to space intermediate portions of the cover from the spring and to take whatever wear occurs as an incident to relative movement between the spring and cover.

Other objects and advantages of the invention will be more apparent from the following description taken in connection with the accompanying drawings, in which:

Fig. 1 illustrates a spring having one of our improved covers associated with each half thereof. One of the covers is illustrated in its installed position and the other cover is illustrated as being installed;

Fig. 2 is a side elevation, partly in section, of one of our improved spring covers;

Fig. 3 is a horizontal section taken on the line 3—3 of Fig. 2;

Fig. 4 is a vertical section taken on the line 4—4 of Fig. 1 and illustrating the fit of an end band around the spring leaves;

Fig. 5 is a vertical section taken on the line 5—5 of Fig. 1 and illustrating the flexible lip which improves the seal;

Fig. 6 is a section on the line 6—6 of Fig. 1 which illustrates the spacing of the intermediate cover walls from the spring leaves;

Fig. 7 is a section on the line 7—7 of Fig. 1 which illustrates the pocket provided for the reception of a spring clip; and Fig. 8 is a perspective view of a section of one end of a spring cover.

A conventional leaf spring 10 is partially illustrated in Fig. 1. A pair of covers 12 and 14 are provided to cover the spring. Each cover is adapted to extend from the central portion of the spring to substantially the end of the spring. The covers 12 and 14 are basically similar although they may be varied to suit individual requirements. For example, cover 12 of Fig. 1 is illustrated as being provided with one pocket for the reception of a spring clip while cover 14 is illustrated as being provided with two such pockets and as having a greater length. Since these variations are dictated by the shape of the spring to be covered they will not be dealt with further and one cover such as the cover 14 will be considered herein for purposes of explanation. The cover 14 as illustrated in Figs. 2 and 3 includes an intermediate body portion 16 which is hollow and has top, bottom and side walls defining in their relaxed state an inner compartment having a volume greater than the volume of the corresponding portion of a spring intended to be located in the compartment. A plurality of longitudinally extending protrusions or ribs 18 are integrally formed on the inner walls of the cover to govern the spacing of the cover walls from the spring. Referring to Fig. 6 it will be seen that a space 20 is provided between the spring and the walls of the cover for the reception of lubricant and that any wear which occurs as an incident to relative movement between the cover and spring is taken by the beads.

The bottom of the intermediate portion of the cover is shown as provided at spaced intervals with depressed portions 22 which provide a space to receive a conventional spring clip 24 as illustrated in Fig. 7.

The ends of the cover are formed to provide thick bands 26 and 28 which have the inner walls thereof shaped to conform to the contour of the spring and are thus adapted to tightly engage the spring to seal lubricant within the cover and prevent the entrance of water and dirt from without the cover. In Fig. 4 the tight fit of the band 26 around the spring is illustrated. The band 28 is illustrated rather clearly in Fig. 8.

It has also been found desirable to provide flexible lips 30 and 32 at the ends of the cover. The lip 30 extends around the inner edge of the band 26 and is relatively easily deformable so that any inaccuracies existing in the contour of the spring or the contour of the interior of the band 26 cannot provide a leak. The readily deflectable lip 30 assumes the exact contour of the spring. The lip 32 operates on a similar principle as the lip 30 and is spaced inwardly from the band 28 and separated therefrom by a groove shown in Fig. 2. The shape of the lip 32 is slightly different from that of the lip 30 merely because the spring has a different cross section at the corresponding location. It should be noticed that the lips can be provided with tabs 34 or other distinctive features of the contour as required by the spring with which the cover is intended to cooperate. The tab 34 is provided on the lip 32 because of the presence of a groove 36 in the upper leaf of the spring as illustrated in Fig. 5. It should be recognized that the shape of the lip is dictated by the shape of the spring and that deviations from the shape illustrated do not depart from our invention. The lip 30 is deflected to the right in Fig. 2 by the insertion of the spring and this further opposes the escape of lubricant.

If desired thickened wall portions 40 may be provided to serve as pads which facilitate stacking of covered springs during manufacture or shipment and which protect the covers against being torn by such stacking.

It should also be noted that the bottom wall 42 of the cover is thicker throughout its length and width than the other walls to prevent injury from road stones thrown up against the cover as an incident to vehicle motion.

We claim:

A one-piece tubular, rubber-like cover for a vehicle spring terminating at each end in a band adapted to tightly grip the spring, said cover including an intermediate portion connecting said bands and having top, bottom and side walls defining in their relaxed state an inner compartment having a volume greater than the volume of the corresponding portion of a spring intended to be located in the compartment, longitudinally extending ribs integrally formed on the inner surface of each of said walls to engage the spring and position the intermediate portion of said cover so that each of said walls is located in spaced relationship to said spring for the reception of lubricant therebetween, said cover having an integral transverse flexible lip parallel to and spaced from each of said bands, each of said lips extending inwardly from each of said walls and having the contour of the external surface of the spring intended to be assembled therewith to prevent the escape of lubricant from the intermediate portion of said cover.

GEORGE D. McCARTHY.
ARTHUR H. EDWARDS.

REFERENCES CITED

The following references are of record in the file of this patent:

UNITED STATES PATENTS

| Number | Name | Date |
|---|---|---|
| 1,713,611 | Little | May 21, 1929 |
| 1,719,439 | Nathan | July 2, 1929 |
| 1,762,955 | Bolin | June 10, 1930 |
| 2,032,583 | Laursen | May 3, 1936 |
| 2,157,418 | Lippitt | May 9, 1939 |

FOREIGN PATENTS

| Number | Country | Date |
|---|---|---|
| 134,070 | Great Britain | Oct. 30, 1919 |